UNITED STATES PATENT OFFICE.

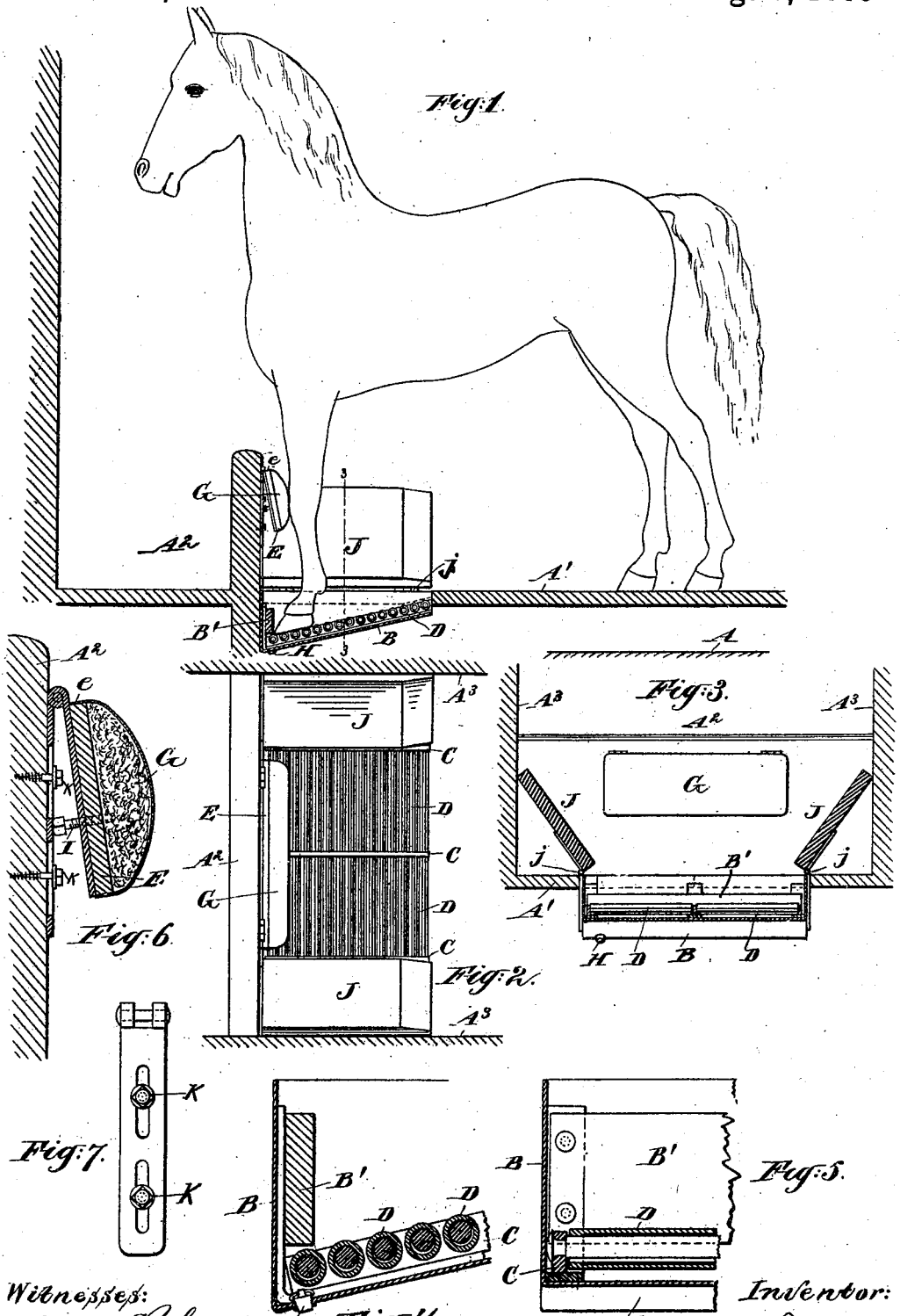

ALPHONSE COTÉ, OF BROOKLYN, NEW YORK.

APPARATUS FOR TREATING SPRUNG LEGS IN HORSES.

SPECIFICATION forming part of Letters Patent No. 502,849, dated August 8, 1893.

Application filed August 5, 1892. Serial No. 442,252. (No model.)

*To all whom it may concern:*

Be it known that I, ALPHONSE COTÉ, a citizen of the United States, residing at Brooklyn, Kings county, in the State of New York, have invented a certain new and useful Improvement in Apparatus for Treating Sprung Legs in Horses, of which the following is a specification.

I construct an improved stall which may serve in the ordinary manner, but is also adapted to cure and prevent the injury and deformity of the knees of horses. It is particularly important to remedy the affection usually denominated "knee sprung." A sprung leg when extended remains slightly bent at the knee. It can be cured by gently and persistently straining the leg into a straight position. A patent to me, dated September 23, 1884, No. 305,573, provided means for attaining this end by an attachment to the leg. The present invention attains it by means which are preferable, and more certainly effective. I provide in an ordinary stall, or in a special part of the stable or other place set apart for this invention, an inclined series of rollers on which the horse rests his fore feet to obtain access to the manger. The rollers induce the feet to move forward on the incline, and I provide pads at a proper height above the rollers to receive the knees. If the horse finds the attitude wearisome, until he has become accustomed to it, he can move backward and stand on a plane and firm portion of the structure, usually a false floor or platform a little above the main floor. But my experiments indicate that the animal soon becomes accustomed to such gentle straining of the leg, and he will remain in that position for a long period without protest, even after the food in the manger is consumed. I provide for varying the conditions for imposing the gentle strains on the legs so that such strains may be increased or diminished. If one leg is unaffected, or is cured more readily than the other, the straightening strain will be imposed principally or entirely upon the worst leg, because of that leg being most bent. I provide for bathing the feet in connection with the straightening strain. I provide doors hinged at each side of the tank, by closing which the tank and the rollers may be covered and the horse may stand with all his feet on a plane firm support composed of the false floor and these doors. When the doors are opened out to allow the rollers and tank to be used, the doors may each stand in a nearly perpendicular position on one side and the other of the tank. I provide for shifting the pad up and down to accommodate knees which come at different heights.

The accompanying drawings form a part of this specification and represent what I consider the best means of carrying out the invention.

Figure 1 is a longitudinal section. Fig. 2 is a plan view of a portion, and Fig. 3 a transverse vertical section on the line 3—3 in Fig. 1. The remaining figures represent small portions on a larger scale. Fig. 4 is a portion of a longitudinal section corresponding to Fig. 1. Fig. 5 is a portion of a transverse section corresponding to Fig. 3. Fig. 6 is a longitudinal section. Fig. 7 shows the upright leaf of one of the hinges with its provisions for adjusting up and down by slots and screws.

Similar letters of reference indicate corresponding parts in all the figures where they appear.

A is the main floor of a stable and A' a false floor, raised and firmly supported sufficiently above the main floor.

B is a tank of galvanized sheet iron, or other suitable material, and C is a framing carrying the two sets of horizontal rollers D. A fender strip of soft plank B' or other suitable material is supported in the front of the tank B in the position represented to defend the tank from blows when the horse's feet move forward on the series of rollers.

E is a board hinged at the upper edge $e$ to the fixed work of the manger and carrying on its outer face a cushion G of leather, or other sufficiently yielding material made into a pad. This pad is held at the proper height from the rollers to receive the knees of the horse.

$A^2$ is the manger.

$A^3$ are the sides of the stall.

The tank B should be tight, and water or any solution in the tank will bathe the feet during the time they remain near the bottom of the inclined plane formed by the series of rollers.

The frames C and the series of rollers D may be drawn out and washed, or otherwise treated, and returned with very little labor. The drawing out of these frames and the rollers carried therein leaves the tank exposed to be easily emptied or scoured.

H is a plug inserted in a hole in the bottom of the tank, which may be removed to empty the tank.

The pad may be adjusted forward and backward by turning the screw I in one direction or the other. Turning the screw in one direction withdraws it from the pad or other part into which it is tapped, and makes the pad more effective. Turning it in the other direction turns the screw into the pad and relaxes the force of the pad so that it may move forward and be less effective. If only one knee is sprung, or one of the knees is sprung more than the other, the faulty one will bear with the most force against the pad and be most powerfully acted upon by the curative strain thus applied. The rollers D are sufficiently long tubes of wrought iron pipe, or other suitable material, bushed internally at each end and fitted on cylindrical rods of the framing C. They should be lubricated at intervals.

J, J, are doors horizontally hinged to the fixed work at $j, j$. Each is adapted to cover one half of the tank.

Whenever the device is to be put out of use, the doors J may be turned down into the horizontal position in which they serve as sufficient covers. The horse may stand upon them with his fore feet level with his hind feet, and the stall will then serve in all respects as the ordinary one.

K are screws tapped through slots in the hinges which support the pad. By slackening these screws the pad may be shifted up and down to accommodate animals of different heights and those in which the knees may for any reason come at different heights.

Modifications may be made without departing from the principle or sacrificing the advantages of the invention. Instead of two sets of short rollers D, I can use one set extending the whole width of the tank. In such case the middle portion of the framing C will be omitted. I prefer the construction shown. The tank may be made of hard wood or other suitable material, other than galvanized iron. The rollers may be increased or diminished in number, and correspondingly modified in size. A greater or less length of stall may be occupied by the tank B and the set of rollers D. I can vary the inclination of the rollers D.

Parts of the invention may be used without the whole. I can use the series of rollers without the tank. I can substitute inclined planes for the rollers, taking care to make them as smooth as practicable, and to lubricate them with grease of a proper hardness, or soap, so that the feet will move downward by sliding on the inclined planes. I prefer the rollers as shown, because the feet move down the inclines easier on such. If shoes are retained on the fore feet they should be without calks,—practically smooth. If the services of the animal can be dispensed with while the cure is progressing, it is preferable to remove the shoes, and keep them removed for such period.

The invention is valuable in the treatment of horses, mules, asses, and any animals liable to become knee sprung, or to have any corresponding affection of whatever name, which can be remedied by the gentle straining of the fore legs into a straight condition, and holding them so.

Instead of letting the animal's foot rest directly on the rollers, there may be a series of movable slats analogous to what is sometimes termed the inclined railway in a horse-power machine, strongly supported and arranged to move easily down the incline.

It may be preferred in some cases to hold the false floor at an inclination nearly corresponding to that of the rollers. Instead of a false floor, the animal may stand with his hind feet on the floor A, and the inclined series of rollers and tank may be sunk below the general level of the floor. I prefer the construction shown.

Other means may be employed for adjusting the pad up and down and to adjust its prominence so as to press with more or less force against the knee or knees.

I claim as my invention—

1. In a stall for animals, a yielding pad G arranged to receive the knee and to press gently backward so as to straighten the leg, substantially as herein specified.

2. A stall for animals, having in combination with the manger $A^2$ and sides $A^3$ an inclined plane adapted to support the foot and to cause it to move forward, and a pad G adapted to receive the knee and press it backward, as herein specified.

3. A stall for animals, having in combination with the manger $A^2$ and sides $A^3$ an inclined plane adapted to support the foot and to cause it to move forward, and provided with a series of rollers to facilitate such movement of the foot, and a pad G, adapted to receive the knee and press it backward, as herein specified.

4. A stall for animals, having in combination with the manger $A^2$ and sides $A^3$ an inclined plane adapted to support the foot and to cause it to move forward, and a pad G adapted to receive the knee and press it backward, with provisions as the hinged flap E and screw I for adjusting its prominence, all arranged for joint operation substantially as herein specified.

5. The stall described, having a partial floor A', sides $A^3$, tank B, inclined series of rollers D, fender B' pad G and manger $A^2$, combined and arranged to serve substantially as herein described.

6. In a stall, a tank B adapted to contain a bathing liquid, a removable frame C mounted therein, and a series of rollers D arranged to form an inclined plane, in combination with each other and with a fender B' in the interior of the tank near the foot of the incline, and the pad G, all arranged to serve substantially as herein specified.

7. In a stall, a plane to support the fore feet of the animal, inclined forward as shown, a fender to arrest the feet near the bottom of the plane and a pad at a proper height above arranged to press against the knees of the animal and hold them gently backward, in combination with each other and with the fixed flooring A' at or near the level of the rear portion of the incline, and with doors J adapted to cover the incline and make the whole into an ordinary stall when desired, all substantially as herein specified.

In testimony that I claim the invention above set forth I affix my signature in presence of two witnesses.

ALPHONSE COTÉ.

Witnesses:
SAML. SMITH,
H. A. JOHNSTONE.